W. I. BODINE AND C. R. SOLOMON.
FLOODED AMMONIA CONDENSER.
APPLICATION FILED APR. 29, 1918.
1,329,882.
Patented Feb. 3, 1920.
2 SHEETS—SHEET 1.
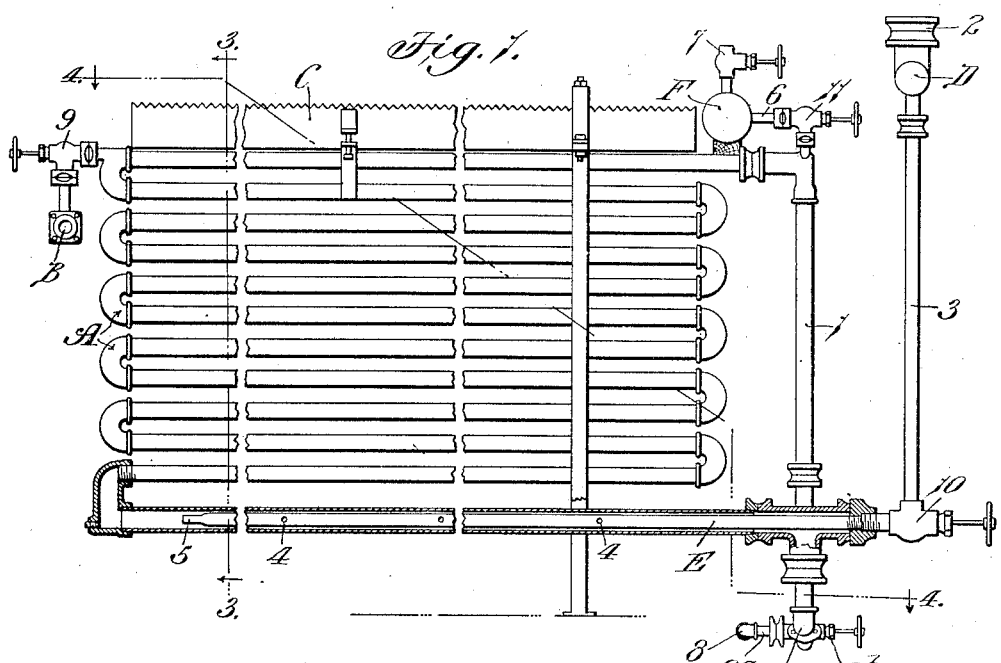
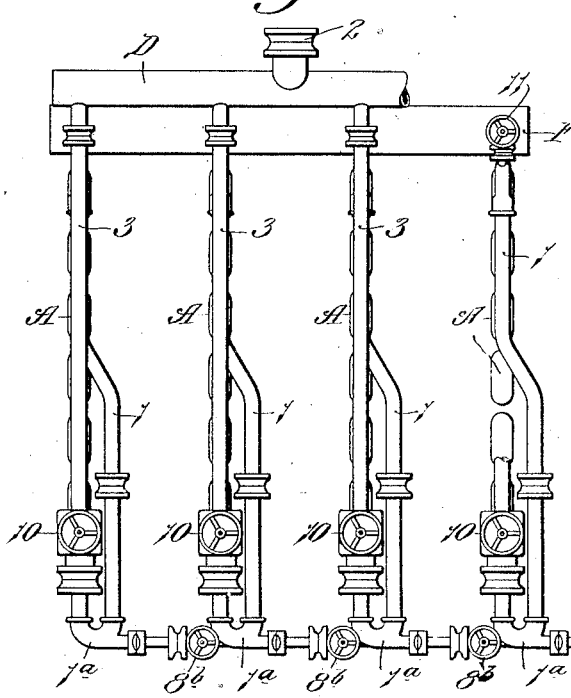
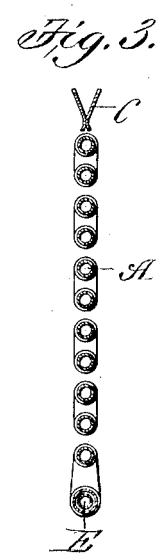

UNITED STATES PATENT OFFICE.

WILLIAM I. BODINE AND CHARLES R. SOLOMON, OF SPRINGFIELD, MISSOURI, ASSIGNORS TO UNITED IRON WORKS COMPANY, OF SPRINGFIELD, MISSOURI, A CORPORATION OF MISSOURI.

FLOODED AMMONIA-CONDENSER.

1,329,882.   Specification of Letters Patent.   Patented Feb. 3, 1920.

Application filed April 29, 1918. Serial No. 231,368.

*To all whom it may concern:*

Be it known that we, WILLIAM I. BODINE and CHARLES R. SOLOMON, citizens of the United States, residing in the city of Springfield, county of Greene, and State of Missouri, have invented a certain new and useful Improvement in Flooded Ammonia-Condensers, of which the following is a full, clear, and exact description, such as will enable others skilled in the art to which it appertains to make and use the same.

This invention relates to flooded ammonia condensers.

One object of the invention is to provide a flooded ammonia condenser which is so constructed that the liquid ammonia discharged from the condenser will be at practically the same temperature as the temperature of the water used to cool the condenser.

Another object is to provide a flooded ammonia condenser in which the hot ammonia gas is supplied to the condenser in such a manner that the liability of back pressure being created is reduced to a minimum.

Another object is to provide a multiple coil flooded ammonia condenser whose coils or sections are connected together in such a manner that it is practically impossible for one section to become inoperative and deliver hot gas to the liquid line leading from the condenser. Other objects and desirable features of our invention will be hereinafter pointed out.

To this end we have devised a flooded ammonia condenser in which the liquid ammonia circulates through the condenser in an opposite direction to the flow of the water that is used to cool the condenser. The cooling water is supplied to the top or upper portion of the coil or closed circulating passageway through which the liquid ammonia circulates, and in flowing downwardly over said coil, extracts the heat from the liquid ammonia. The hot ammonia gas is supplied to the lower portion of the coil preferably by means of a distributing pipe submerged in the liquid ammonia in the lower portion of the coil and provided at numerous points throughout its length with discharge orifices through which the ammonia gas escapes directly into the cold liquid ammonia in the lower portion of the coil, thus causing the gas to condense instantly. In the form of our invention herein shown the condenser comprises a plurality of coils or sections, and said sections are connected together in such a manner that in the event that one coil becomes inoperative, due to the failure of the liquid ammonia to circulate properly through same for any reason, such, for example, as an excessive amount of gas in said coil, the weight or pressure of the liquid ammonia in the other coils will exert an influence on the coil which is not operating properly, tending to force the excess gas out of the inoperative coil and thus automatically restoring the equilibrium. By constructing the condenser in this manner it is impossible for one coil or section of the condenser to "cut out" and thus deliver hot ammonia gas to the liquid line leading from the condenser.

Figure 1 of the drawings is a side elevational view of a flooded ammonia condenser constructed in accordance with our invention.

Fig. 2 is a front elevational view of the condenser.

Fig. 3 is a vertical sectional view of one section of the condenser, taken on the line 3—3 of Fig. 1.

Figure 4:
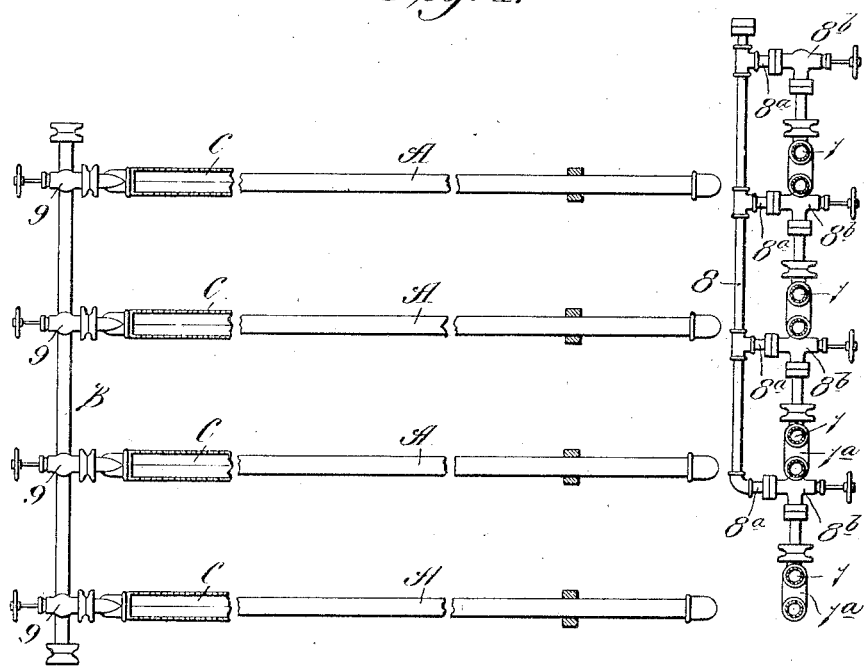
Fig. 4 is a horizontal sectional view, taken on the line 4—4 of Fig. 1.

Referring to the drawings, which illustrate the preferred form of our invention, A designates a plurality of coils or condenser sections through which liquid ammonia circulates, each of said coils being preferably composed of a plurality of horizontally-disposed pipes connected together in such a manner that they form a closed circulating passageway, the upper and lower ends of each coil being connected together by a vertically-disposed pipe 1. Each coil or section of the condenser is also provided with means for causing cooling water to flow downwardly over the outside of the coil and means for supplying hot ammonia gas to the lower portion of the coil. The liquid ammonia is discharged from the upper left hand ends of the coils or sections A into a discharge header B that communicates with all of the coils A, as shown in Figs. 1 and 4. In the form of our invention herein shown the cooling water is supplied to the coils by means of troughs C arranged above the coils and having notched or saw-toothed upper edges so as to insure an even distribution of the cooling water over the coils. The hot ammonia gas is supplied to a horizontally-disposed gas header D through a connection 2 and is conducted from said gas header through vertically-disposed pipes 3 into gas distributing pipes E in the lower portions of the coils, each coil being provided with a separate gas distributing pipe E. The gas distributing pipes E each consist of a horizontally-disposed pipe arranged inside of the bottom pipe or passageway of the coil with which it coöperates and provided at numerous points throughout its length with discharge orifices 4, as shown in Fig. 1, so that the hot ammonia gas will escape from the distributing pipe E into cold liquid ammonia in which said distributing pipe is submerged. The distributing pipes E are also preferably provided with reduced discharge ends 5 so that the ammonia gas, in escaping from said reduced ends 5, will give the liquid ammonia in the coils a slight impetus upwardly through the coils. An air drum F that is arranged at the upper side of the condenser adjacent the front end of same, as shown in Fig. 1, is connected by means of branches 6 with the vertically-disposed pipes 1 that connect the upper and lower ends of the coils together, said air drum being provided with a vent 7. Each coil or section A of the condenser is provided at its lower end with a trap formed by a return bend or loop 1ª at the lower end of the pipe 1 that leads from the upper end of the coil and all of the coils or sections of the condenser are connected together by an equalizing device, so as to prevent any section of the condenser from cutting out and remaining inoperative, and thus throwing the entire work on the remaining sections of the condenser. In the embodiment of our invention herein shown said equalizing device is formed by a horizontally-disposed pipe 8, shown in Fig. 4, provided with branches 8ª that are connected with the loops or traps 1ª of the condenser sections, said branches being equipped with controlling valves 8ᵇ. Each coil or section of the condenser is provided with a valve 9 for governing the discharge of the liquid ammonia into the discharge header B, a valve 10 for regulating the supply of gas to the gas distributing pipe E and a valve 11 arranged in the connection between the air drum F and the return pipe 1 at the front end of the section. When the condenser is put in operation the coils or sections of same are completely filled with liquid ammonia clear up to the top or upper end of each coil. When the ammonia compressor with which the condenser is used is started, hot ammonia gas will be supplied to the gas header D and will flow from said gas header into the gas distributing pipes E in the lower portions of the coils A of the condenser, the hot ammonia gas escaping through the orifices 4 and reduced ends 5 of said distributing pipes and mixing with the cold liquid ammonia in the lower portions of the coils, and thus becoming condensed instantaneously. The liquid ammonia circulates upwardly through the coils A and by the time it reaches the upper ends of the coils, the heat has been extracted from same by the cooling water that flows downwardly over the outer sides of the coils. Consequently, the liquid ammonia that escapes from the condenser into the discharge header B is at practically the same temperature as the temperature of the water used to cool the condenser. It will, of course, be understood that when the condenser is in operation some liquid ammonia is continually passing from the coils into the discharge header B, due, of course, to the fact that the hot ammonia gas that is supplied to the lower portions of the coils of the condenser is condensed into liquid ammonia as soon as it mixes with the cold liquid ammonia in which the gas distributing pipes E are submerged. The main body of the liquid ammonia in the condenser that flows from the upper to the lower ends of the coils through the return pipes 1 is usually within one or two degrees of the temperature of the cooling water supplied by the troughs C. Consequently, the hot ammonia gas supplied by the distributing pipes E will condense instantly, and furthermore, all of the work of condensation is accomplished in the bottom pipes of the coils A. In the flooded ammonia condensers now in general use the hot ammonia gas is supplied to the coils of the condenser by means of injectors or nozzles which tend to produce considerable back pressure in the condenser. In our improved condenser the possibility of back pressure being created is reduced to a minimum, owing to the fact that the hot ammonia gas is supplied to the coils of the condenser by means of distributing pipes which are provided at numerous points throughout their length with discharge orifices through which the ammonia gas escapes directly into the liquid ammonia in which said distributing pipes are submerged. Still another desirable feature of our improved condenser is that it is practically impossible for one coil or section of the condenser to become inoperative, due to failure of the liquid ammonia to circulate properly through same, and thus supply hot gas to the discharge line leading from the condenser. In other words, if the ammonia in one coil should fail to circulate properly, due, for example, to the mixture of gas and liquid in said coil being rendered lighter than the liquid in the other coils by an excessive amount of gas in the said inoperative coil, the weight or pressure of the ammonia in the coils that are operating properly will exert an influence on the inoperative coil, tending to force the gas out of same and restoring the equilibrium. This, of course, is due to the fact that the condenser is equipped with an equalizing device which connects all of the coils or sections of the condenser together, and so far as we know, this feature is broadly new in a flooded ammonia condenser.

From the foregoing it will be seen that the condenser above described is a complete counter current condenser in which the cooling water circulates over the coils in an opposite direction to the flow of the liquid ammonia through the coils, the liquid ammonia being discharged from the top or upper ends of the condenser sections at practically the same temperature as the temperature of the water used to cool the condenser. Furthermore, in a condenser of the construction above described, the hot ammonia gas that is supplied to the condenser condenses instantly upon coming in contact with the cold liquid ammonia in the lower portions of the coils, and furthermore, said ammonia gas is supplied to the condenser in such a manner that the possibility of back pressure being created is reduced to a minimum. In the flooded ammonia condensers now in general use, considerable trouble is often experienced if the load lightens or in case an excessive amount of cooling water is supplied to one coil or section of the condenser, as either of the above conditions would cause some coil of the condenser to cut out and throw the entire work on the remaining coils or sections, the inoperative coil remaining inoperative even after the load becomes normal, or the supply of cooling water becomes normal. In our improved condenser the various sections or coils of the condenser are connected together by an equalizing device which absolutely eliminates the possibility of one coil or section of the condenser becoming inoperative and remaining in an inoperative condition a sufficient length of time to result in hot gas being supplied to the liquid discharge line leading from the condenser.

Having thus described our invention, what we claim and desire to secure by Letters Patent is:

1. A flooded ammonia condenser, comprising a coil or condenser section, means for delivering ammonia gas to one end of said coil, a discharge pipe at the opposite end of said coil through which the excess liquid ammonia escapes, a separate and distinct pipe connecting the upper and lower ends of the coil through which the cooled liquid ammonia circulates freely, an air drum communicating with the upper end of the coil, and means for causing cooling water to flow over the coil in a counter direction to the flow of the liquid ammonia through the coil.

2. A flooded ammonia condenser, comprising a coil or passageway through which liquid ammonia circulates, and an ammonia gas distributing pipe adapted to be submerged in the liquid ammonia in said coil, said distributing pipe being provided at numerous points throughout its length with discharge orifices through which the ammonia gas escapes and also having a reduced discharge end through which the ammonia gas escapes and thus gives an impetus upwardly to the liquid ammonia circulating through the coil.

3. A flooded ammonia condenser, comprising a plurality of vertically-disposed coils through which liquid ammonia circulates, the upper and lower ends of each coil being connected together by a return pipe through which the ammonia circulates freely from the upper to the lower end of the coil, a trap or loop at the lower end of each coil, an equalizing device connected to the traps of the various coils so as to establish direct communication between all of the coils, and means for introducing ammonia gas into the lower portion of each coil at a point beyond the trap in the return pipe of the coil.

4. A flooded ammonia condenser, comprising a vertically-disposed coil through which liquid ammonia circulates, a return pipe leading from the upper end of said coil and provided at its lower end with a trap that communicates with the bottom pipe of the coil and which is of such cross-sectional area that the liquid ammonia will circulate freely through same, an equalizing device connected to the traps of the various coils so as to establish direct communication between all of the coils, an ammonia gas distributing pipe arranged inside of the bottom pipe of the coil and provided at numerous points throughout its length with discharge orifices, and a connection between said distributing pipe and a supply of ammonia gas.

5. A flooded ammonia condenser, comprising a plurality of vertically-disposed coils or condenser sections through which liquid ammonia circulates, a liquid ammonia discharge header communicating with the upper ends of said coils, means for causing cooling water to flow downwardly over said coils, a gas header connected with gas distributing pipes arranged inside of the bottom pipes of the coils, each coil of the condenser being provided with a return pipe leading from the upper to the lower end of the coil and equipped at its lower end with a trap or loop that communicates with the bottom pipe of the coil, and an equalizing device common to all of the coils and connected by branches with the traps of the various coils.

6. A flooded ammonia condenser, comprising a plurality of vertically-disposed coils or condenser sections through which liquid ammonia circulates, a liquid ammonia discharge header communicating with the upper ends of said coils, means for causing cooling water to flow downwardly over said coils, a gas header connected with gas distributing pipes arranged inside of the bottom pipes of the coils, each coil of the condenser being provided with a return pipe leading from the upper to the lower end of the coil and equipped at its lower end with a trap or loop that communicates with the bottom pipe of the coil, means for establishing free communication at all times between the traps of the various coils, and a vented air drum provided with branches that communicate with the top pipe of each coil.

7. A flooded ammonia condenser, comprising a plurality of coils or condenser sections through which liquid ammonia circulates, and an equalizing device that establishes direct communication between the lower ends of said coils in such a manner that in the event that the liquid ammonia in one coil fails to circulate properly, due to the presence of an excessive amount of gas in said coil, the weight or pressure of the liquid ammonia in the operative coils will cause the excess gas to be expelled from the inoperative coil and thus restore the equilibrium.

8. A flooded ammonia condenser, comprising a plurality of coils or condenser sections, each of which has a return pipe through which the ammonia circulates freely from the upper to the lower end of the coil, and an equalizing device that establishes direct communication between the lower ends of all of the coils or sections and thus eliminates the possibility of one coil becoming inoperative due to the presence of an excessive amount of gas in said coil.

9. A flooded ammonia condenser, comprising a plurality of vertically-disposed coils or condenser sections through which liquid ammonia circulates, each of said coils having a return pipe that leads from the upper end of the coil, a trap or loop arranged between each of said return pipes and the lower end of the coil with which said return pipe coöperates, thus forming a closed circulating passageway, and means for establishing communication between the traps of the various coils or sections of the condenser.

10. A flooded ammonia condenser, comprising a plurality of vertically-disposed coils or condenser sections through which liquid ammonia circulates, each of said coils having a return pipe that leads from the upper end of the coil, a trap or loop arranged between each of said return pipes and the lower end of the coil with which said return pipe coöperates, thus forming a closed circulating passageway, means for establishing communication between the traps of the various coils or sections of the condenser, and an ammonia gas distributing pipe arranged inside of the bottom pipe of each coil of the condenser and provided at numerous points throughout its length with discharge orifices through which ammonia gas escapes and mixes with the liquid ammonia in the bottom portion of the coil.

WILLIAM I. BODINE.
CHARLES R. SOLOMON.